US010455070B2

(12) United States Patent
Chen et al.

(10) Patent No.: US 10,455,070 B2
(45) Date of Patent: Oct. 22, 2019

(54) PLATFORM FOR WIRELESS INTERACTION WITH VEHICLE

(71) Applicant: THUNDER POWER NEW ENERGY VEHICLE DEVELOPMENT COMPANY LIMITED, Central (HK)

(72) Inventors: Yong-Syuan Chen, New Taipei (TW); Jen-Chieh Hsiao, Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 15/172,588

(22) Filed: Jun. 3, 2016

(65) Prior Publication Data

US 2017/0182976 A1 Jun. 29, 2017

Related U.S. Application Data

(62) Division of application No. 14/981,789, filed on Dec. 28, 2015, now Pat. No. 9,736,289.

(51) Int. Cl.
*H04M 1/72* (2006.01)
*H04M 1/725* (2006.01)
(Continued)

(52) U.S. Cl.
CPC ......... *H04M 1/72522* (2013.01); *B60R 16/03* (2013.01); *B60R 16/037* (2013.01);
(Continued)

(58) Field of Classification Search
CPC ........... B60R 25/24; H04L 67/02; H04W 4/12
(Continued)

(56) References Cited

U.S. PATENT DOCUMENTS 8,989,955 B1 * 3/2015 Hart ................. G07C 5/008
340/576
9,171,268 B1 * 10/2015 Penilla ............... G06Q 10/02
(Continued)

FOREIGN PATENT DOCUMENTS

DE 10 2013 006087 A1 1/2014
DE 10 2014 118115 A1 7/2015
(Continued)

OTHER PUBLICATIONS

U.S. Appl. No. 14/981,789, filed Dec. 28, 2015, Non-Final Rejection dated Apr. 6, 2016, all pages.
(Continued)

*Primary Examiner* — Anne M Antonucci
*Assistant Examiner* — James E Stroud
(74) *Attorney, Agent, or Firm* — Kilpatrick Townsend & Stockton LLP

(57) ABSTRACT

Techniques described herein include a platform for providing user interaction with a vehicle's functions on a mobile device. In some embodiments, the vehicle and mobile device may both be in communication with a service provider computer, that may facilitate communications between the two. In some embodiments, a user is provided with various details related to the vehicle's condition as well as a list of functions that may be initiated by the user. The user is able to select one or more of the listed functions to be performed by the vehicle while located any distance from the vehicle. In some embodiments, the service provider computer may determine whether the user is authorized to initiate a particular vehicle function. Upon selection of a vehicle function from the list of vehicle functions, a processor device in the vehicle executes the function.

19 Claims, 5 Drawing Sheets

(51) Int. Cl.

| | | |
|---|---|---|
| *H04L 29/08* | (2006.01) | |
| *B60R 16/03* | (2006.01) | |
| *B60R 25/24* | (2013.01) | |
| *H04W 4/12* | (2009.01) | |
| *B60R 16/037* | (2006.01) | |
| *B60R 25/01* | (2013.01) | |
| *B60R 25/10* | (2013.01) | |
| *B60R 25/20* | (2013.01) | |
| *H04W 84/04* | (2009.01) | |

(52) U.S. Cl.
CPC .............. *B60R 25/01* (2013.01); *B60R 25/10* (2013.01); *B60R 25/209* (2013.01); *B60R 25/24* (2013.01); *H04L 67/02* (2013.01); *H04L 67/12* (2013.01); *H04L 67/306* (2013.01); *H04M 1/72527* (2013.01); *H04M 1/72552* (2013.01); *H04W 4/12* (2013.01); *B60R 2325/205* (2013.01); *H04L 67/125* (2013.01); *H04W 84/042* (2013.01)

(58) Field of Classification Search
USPC .......................................................... 701/2
See application file for complete search history.

(56) References Cited

U.S. PATENT DOCUMENTS

| | | | |
|---|---|---|---|
| 9,365,188 B1 | 6/2016 | Penilla et al. | |
| 9,383,214 B2 | 7/2016 | Shrinath et al. | |
| 9,736,289 B2 | 8/2017 | Chen et al. | |
| 9,875,591 B2 | 1/2018 | Watters et al. | |
| 9,904,289 B1* | 2/2018 | Hayward | G08G 1/166 |
| 2008/0082221 A1 | 4/2008 | Nagy | |
| 2009/0027188 A1* | 1/2009 | Saban | B60N 2/002 |
| | | | 340/521 |
| 2009/0177336 A1 | 7/2009 | McClellan et al. | |
| 2010/0075655 A1* | 3/2010 | Howarter | B60R 25/2009 |
| | | | 455/420 |
| 2011/0060480 A1* | 3/2011 | Mottla | G06Q 10/02 |
| | | | 701/2 |
| 2012/0268267 A1 | 10/2012 | Anderson | |
| 2013/0006479 A1* | 1/2013 | Anderson | G07C 9/00111 |
| | | | 701/49 |
| 2013/0151084 A1* | 6/2013 | Lee | B60R 25/2054 |
| | | | 701/48 |
| 2013/0310446 A1* | 11/2013 | Rosin-Arbesfeld | |
| | | | A61K 48/0058 |
| | | | 514/44 R |
| 2014/0097937 A1 | 4/2014 | Gercekci | |
| 2014/0121890 A1* | 5/2014 | Gercekci | G08C 17/02 |
| | | | 701/33.2 |
| 2014/0163778 A1* | 6/2014 | Reich | B60R 16/037 |
| | | | 701/2 |
| 2015/0066246 A1 | 3/2015 | Martin | |
| 2015/0135336 A1* | 5/2015 | Arasavelli | H04B 7/26 |
| | | | 726/29 |
| 2015/0148989 A1 | 5/2015 | Cooper et al. | |
| 2015/0197205 A1 | 7/2015 | Xiong et al. | |
| 2015/0203062 A1* | 7/2015 | Gautama | B60R 16/037 |
| | | | 701/49 |
| 2016/0049033 A1 | 2/2016 | Sigal et al. | |
| 2017/0182977 A1 | 6/2017 | Chen et al. | |
| 2017/0225652 A1 | 8/2017 | Chen et al. | |

FOREIGN PATENT DOCUMENTS

| | | |
|---|---|---|
| DE | 20 2015 104711 U1 | 10/2015 |
| GB | 2 519 658 A | 4/2015 |

OTHER PUBLICATIONS

U.S. Appl. No. 14/981,789, filed Dec. 28, 2015, Final Rejection dated Jul. 19, 2016, all pages.
U.S. Appl. No. 14/981,789, filed Dec. 28, 2015, Non-Final Rejection dated Nov. 4, 2016, all pages.
U.S. Appl. No. 15/172,607, filed Jun. 3, 2016, Non-Final Rejection dated Feb. 24, 2017, all pages.
European Office Action for EP 16 194 316 dated May 12, 2017, 10 pages.
U.S. Appl. No. 15/495,459, filed Apr. 24, 2017, Non-Final Rejection dated Jun. 8, 2017, all pages.
Bose, et al., "Morphing Smart-Phones into Automotive Application Platforms," IEEE Computer Society, May 2011, pp. 53-61.
Mahfoud, et al., "Next Generation Vehicle Network: Web Enabled," IEEE, 2008, pp. 1-7.
Costa-Montenegro, et al., "Vehicular Entertainment Systems," IEEE Vehicular Technology Magazine, Aug. 14, 2012, pp. 73-79.
Stirling, et al., "Mobile Multimedia Platforms," IEEE, 2000, pp. 2541-2548.
U.S. Appl. No. 15/172,607, filed Jun. 3, 2016, Non-Final Rejection dated Oct. 3, 2017, all pages.
U.S. Appl. No. 15/495,459, filed Apr. 24, 2017, Final Rejection dated Oct. 11, 2017, all pages.
U.S. Appl. No. 15/172,607, filed Jun. 3, 2016, Notice of Allowance and Fee Due dated Mar. 7, 2018 all pages.

* cited by examiner

PLATFORM FOR WIRELESS INTERACTION WITH VEHICLE

RELATED APPLICATIONS

The present application is a divisional of Non-Provisional U.S. application Ser. No. 14/981,789, filed Dec. 28, 2015, the disclosure of which is hereby incorporated by reference in its entirety for all purposes.

BACKGROUND

Modern vehicles typically utilize a wireless key fob that is configured to provide some vehicle functionality. For example, a user may lock or unlock the vehicle using the key fob. These key fobs usually operate using radio frequency identification (RFID) technology, which gives the key fob very limited range. The user may not be able to activate a particular function that he or she wishes to because the vehicle is out of range. For example, the user may have forgotten where the vehicle is parked in a very large parking lot. In this example, using the key fob to sound the vehicle's horn, and to subsequently locate the vehicle, may be futile as the vehicle may be out of the key fob's range.

SUMMARY

The present disclosure solves this and other issues with current vehicle function control technology. Disclosed herein is a system and method for enabling vehicle function control on a wireless device. In some embodiments, the user is provided with various details related to the vehicle's condition or location. The user is able to select one or more functions to be performed by the vehicle while located any distance from the vehicle. For example, the user may elect to turn on the vehicle's lights so that he or she may determine where the vehicle is parked. In another example, the user may set the temperature of the vehicle while the user is still some distance from it, allowing the vehicle to warm up or cool down while the user is still approaching the vehicle.

BRIEF DESCRIPTION OF THE DRAWINGS

Various embodiments in accordance with the present disclosure will be described with reference to the drawings, in which:

FIG. 2 depicts an example of information that may be provided to a user device by a vehicle control system in accordance with at least some embodiments;

DETAILED DESCRIPTION

Figure 1:
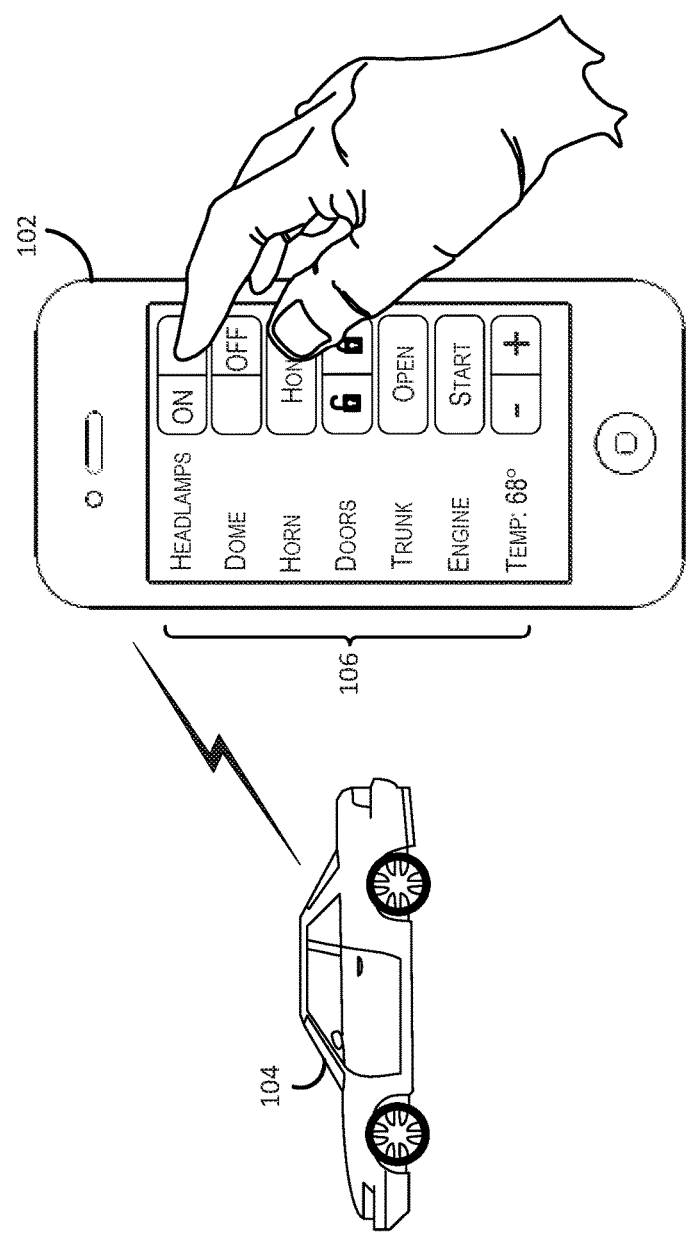
FIG. 1 depicts an example user interaction between a user device and a vehicle control system in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system which enables a user to control various vehicle functions from almost any location. In particular, a vehicle control system configured to provide vehicle functionality may be in communication with a cellular network (or other wireless network). In some embodiments, the vehicle control system may provide information to a user's mobile device over the cellular network. The user may also provide instructions to the vehicle control system via a graphical user interface (GUI) installed on the user's mobile device, which may subsequently result in actions performed by the vehicle control system.

In this disclosure, the user device may store computer executable instructions or code (e.g., a module, application, or other suitable set of executable instructions) configured to receive requests from a user. In some embodiments, a user operating the user device may request an action to be performed by the vehicle control system via the GUI. For example, the user may request that a light or lights of the vehicle be activated from the user device. In another example, the user may initiate an engine startup and warm-up cycle from the user device.

In some embodiments, the vehicle control system may include a processor device located within the vehicle that is in communication with a server or other service provider computer located outside of the vehicle. The service provider computer may be configured to perform one or more calculations related to the performance of one or more vehicle actions. In some embodiments, the processor device may be configured to perform one or more vehicle functions upon receiving instructions to perform the function from the service provider computer.

In some embodiments, the service provider computer may store and maintain information related to the vehicle and/or the user. For example, a user account or profile may be stored at the service provider computer associated with a particular user and/or vehicle. The profile may include one or more configuration settings related to vehicle settings and/or user preferences. For example, in some embodiments, the profile may include configuration settings that indicate a position in which a driver's seat should be placed for a particular driver. Additionally, the profile may include an indication of a temperature that the driver prefers, and/or a radio station preference. Upon receiving a request to prepare the vehicle for that particular driver from the user device, the service provider computer may query the configuration settings and provide instructions to the vehicle control system to relocate the driver seat to the position indicated, adjust the temperature of the vehicle, and tune the radio to the preferred station.

FIG. 1 depicts an example user interaction between a user device and a vehicle control system in accordance with at least some embodiments. In FIG. 1, a user device 102 and a vehicle 104 are depicted as being in communication. The user device 102 may display a graphical user interface configured to enable a user to interact with a vehicle control system of the vehicle 104. The graphical user interface may provide functionality indicators 106 related to various functions that may be performed by the vehicle control system. For example, the vehicle control system may be configured to start or stop a vehicle's engine. The graphical user interface displayed on the user device may depict a function indicator 106 related to an engine startup. Upon receiving an indication that a user has selected the function indicator 106 related to engine startup, the user device may transmit instructions that are received by the vehicle control system, which may subsequently start the engine of the vehicle. In some embodiments, the user may need to be authenticated before he or she can submit a request for a vehicle action. For example, the user may be required to enter a password before he or she can request an action. In some embodiments, the user may be required to submit biometric data to submit a request to the vehicle control system. For example, the user may be required to pass a fingerprint identification scan prior to submitting a request for a vehicle action. In another example, the user may be required to pass a retina scan prior to submitting a request for a vehicle action. Although the disclosure describes example user authentication means as entering a password, passing a fingerprint scan, and/or passing a retina scan, it is not intended that embodiments be limited to these examples. A user authentication means may comprise any suitable means of verifying that a user is authorized to submit a request to a vehicle control system.

In some embodiments, the vehicle control system may include one or more network chips capable of supporting may different types of serial and wireless technologies. For example, the vehicle control system may include network chips configured to support at least one of code division multiple access (CDMA), wide band code division multiple access (WCDMA), wireless fidelity (WiFi) or IEEE 802.11, worldwide interoperability for microwave access (WiMAX) or IEEE 802.16, wireless mesh (Wi-Mesh), and ZigBee or IEEE 802.15.4. In some embodiments, the user device 102 may communicate with the vehicle control system directly. For example, the user device may communicate using a local wireless connection (e.g., Bluetooth®, WiFi, infrared, or any other suitable wireless communication means). In some embodiments, the user device 102 may communicate with the vehicle control system indirectly, or through a proxy. For example, the vehicle control system may establish a communication session with a cellular network. The cellular network may enable the vehicle control system to communicate directly with the user device 102. In some embodiments, the cellular network may enable the vehicle control system to communicate with a service provider computer, which in turn is able to communicate with a user device 102. This will be described in greater detail below.

The vehicle control system may be configured to perform a number of actions upon receiving a signal from the user device 102. For example, the vehicle control system may include a number of electronic actuation devices or switches wired into various electronic systems within the vehicle. Upon receiving a signal from the user device 102 to perform a particular action, one or more of these electronic actuation devices or switches may be activated.

FIG. 2 depicts an example of information that may be provided to a user device by a vehicle control system in accordance with at least some embodiments. The vehicle control system may include a number of sensor devices configured to detect vehicle conditions. For example, the vehicle control system may include accelerometers, pressure sensors, a global positioning system (GPS) chip, voltmeters, camera devices, or any other suitable sensor device type. These sensor devices may collect one or more inputs related to a condition of the vehicle and send a signal to the vehicle control system. In some embodiments, the vehicle control system may associate the received signal with one or more vehicle attributes. For example, the vehicle control system may receive a signal from one or more pressure sensors. The vehicle control system may attribute the received pressure information with the pressure of a particular tire.

Figures 2A, 2B:
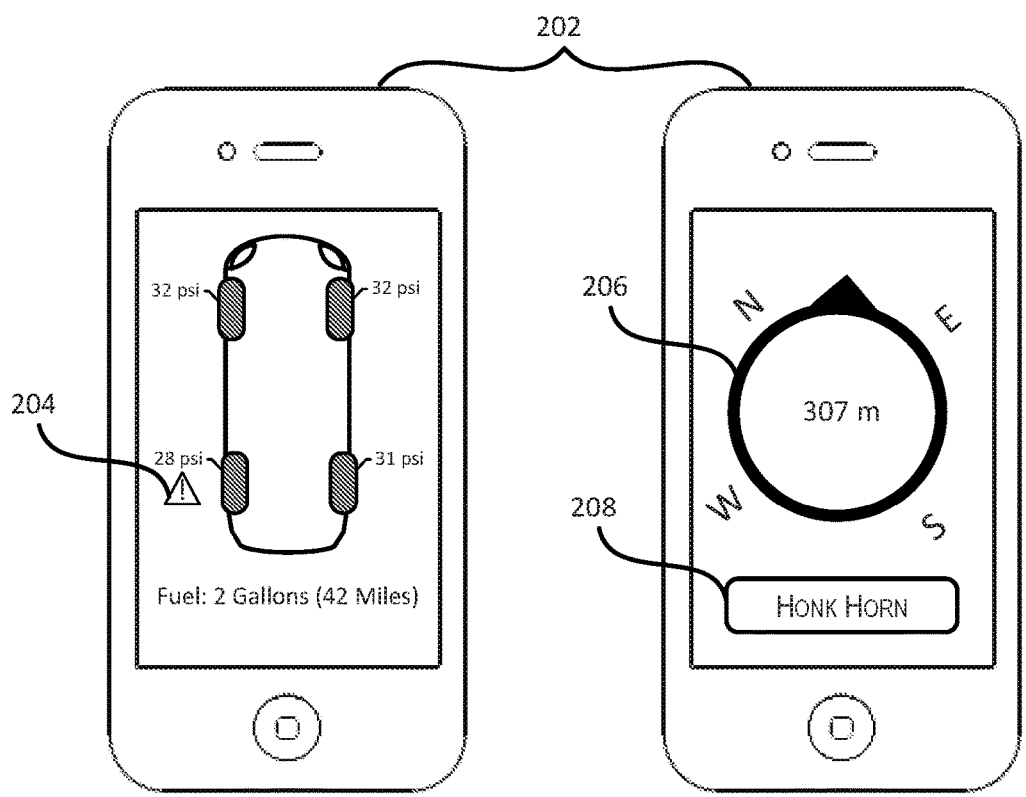
FIG. 2A depicts an example in which the user device may provide information received directly from the vehicle control system, without additional processing being performed by the user device.
FIG. 2B depicts an example in which the user device may modify the information before presenting it.

FIG. 2 has been depicted as FIG. 2A and FIG. 2B to better illustrate embodiments of the disclosure. In some embodiments, the vehicle control system may provide vehicle related information to a user device. For example, the vehicle control system may provide, to a user device, information related to a geographic location of the vehicle, an amount of fuel and/or a distance that may be traveled based on the amount of fuel, tire pressure for each tire, or any other suitable information. In some embodiments, the vehicle control system may provide image information captured by a camera device of the vehicle to the user device.

In FIG. 2, a user device 202 is depicted as displaying various condition information for a particular vehicle. In some embodiments, the depicted user device 202 may execute a vehicle control application or other computer executable program configured to receive information from the vehicle control system. In some embodiments, the information may be presented within a web browser accessed by the user device. For example, the user may utilize a web browser installed on the user device to access a website maintained by a service provider computer. In this example, the service provider computer may require the user to log in or otherwise authenticate himself or herself. The service provider computer may receive information from the vehicle control system in real-time (e.g., the vehicle control system provides information to the service provider computer on a periodic or semi-periodic basis). In some embodiments, the service provider computer may request particular vehicle information. For example, the service provider computer may request (in response to receiving a request from the user device) the vehicle's location information. In some embodiments, the vehicle control system may provide vehicle information to the service provider computer upon detecting a particular event. For example, upon startup of the vehicle, the vehicle control system may use a camera device to capture an image of the driver. In this example, the service provider computer may utilize one or more image processing techniques (such as facial recognition) to determine an identity of the driver. The identity of the driver may subsequently be provided to the user device 202.

FIG. 2 has been depicted as FIG. 2A and FIG. 2B to better illustrate embodiments of the disclosure. In FIG. 2A, the user device may provide information received directly from the vehicle control system, without additional processing being performed by the user device. Some vehicle information may be presented along with highlighting or another notification 204 designed to draw attention to the vehicle information. For example, if a value from the vehicle information falls above or below a predetermined threshold, then the user device may display a notification 204. In some embodiments, the notification 204 may be presented outside of the browser application or GUI. For example, if the vehicle speed goes above a predetermined threshold value, then the user may be notified via a short messaging service (SMS) message.

In FIG. 2B, the user device may modify the information before presenting it. For example, the user device 202 may receive information related to a location of the vehicle. The user device 202 may then process this information, along with information related to a location of the user device itself, and bearing information for the user device, to present a directional indicator 206 for the vehicle in the graphical user interface of FIG. 2B. The directional indicator 206 may be presented to a user to enable him or her to locate the vehicle. In some embodiments, the user device 202 may include one or more function indicators 208. For example, in addition to displaying a direction indicator 206 in the example given above, the user device may display a function indicator 208 which allows a user to activate the vehicle's horn, headlights, or both. In some embodiments, the vehicle information may be provided directly to a third party entity (an entity unaffiliated with either the service provider computer or the user device). For example, the vehicle information may be provided directly to the police. By way of illustration, consider a scenario in which a vehicle has been stolen. The user may select a function indicator 208 that alerts the police to the stolen condition of the vehicle. In addition, the vehicle control system may activate a camera device within the vehicle to capture images of the driver, as well as the vehicle control system's GPS device to capture location information for the vehicle. The image information and location information may both be streamed directly to a police department server or a user device utilized by the police department.

Figure 3:
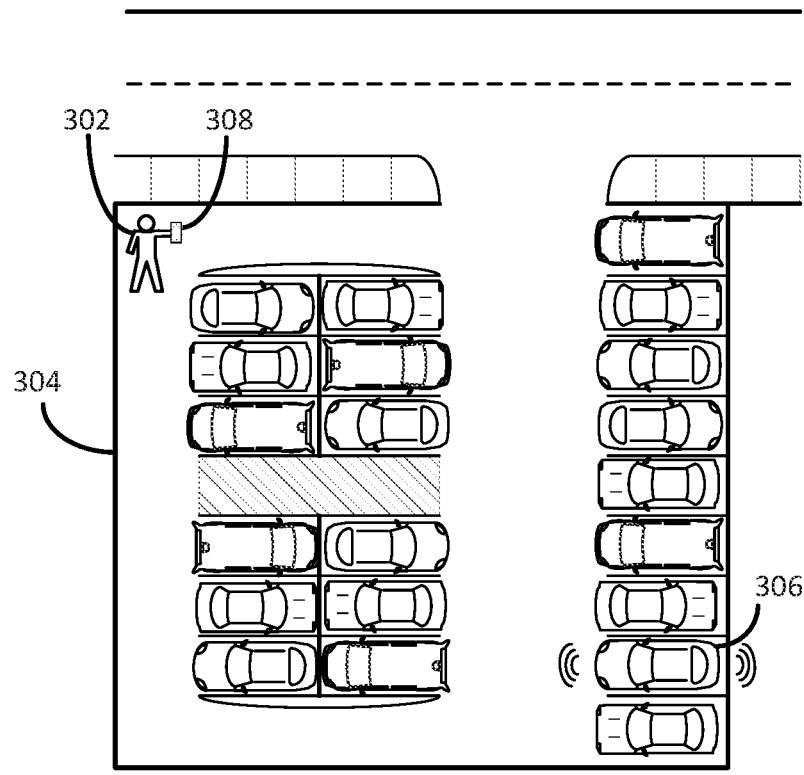
FIG. 3 depicts an illustrative use case of an embodiment in accordance with the disclosure.

FIG. 3 depicts an illustrative use case of an embodiment in accordance with the disclosure. In FIG. 3, a user 302 is depicted as being located within a parking lot 304. In this illustrative example, the user may be attempting to locate his or her vehicle 306. The user may also be in possession of a user device 308. User device 308 may be an example user device 202 of FIG. 2. As depicted in FIG. 3, the user device 308 may be a smartphone or other cellular phone. A smartphone may be any cellular phone that performs one or more functions of a computer, typically having a touchscreen interface, internet access, and an operating system capable of running downloaded applications. User device 308 may store and execute a mobile device application that is configured to enable the user 302 to interact with the vehicle 306.

In the illustrated example, the user 302 may be presented, via the user device 308, with the graphical user interface depicted in FIG. 2B, including a directional indicator 206 and a function indicator 208. The graphical user interface of the user device 308 may update the directional indicator 206 as the user device is moved or rotated. Additionally, the user may select the function indicator 208 to cause the vehicle 306 to alert the user 302 to its location. For example, the vehicle 306 may sound a horn, turn on an interior light, and/or flash a headlamp.

In the illustrated example, the user 302 may, upon failing to locate his or her vehicle 306, utilize the user device 308 to connect with the vehicle 306. The user may then select a function indicator to sound the vehicle horn, or otherwise produce an audible indication of the vehicle's location. The user may then determine, based on the audible indication of the vehicle's location, the direction in which the vehicle 306 is parked.

Figure 4:
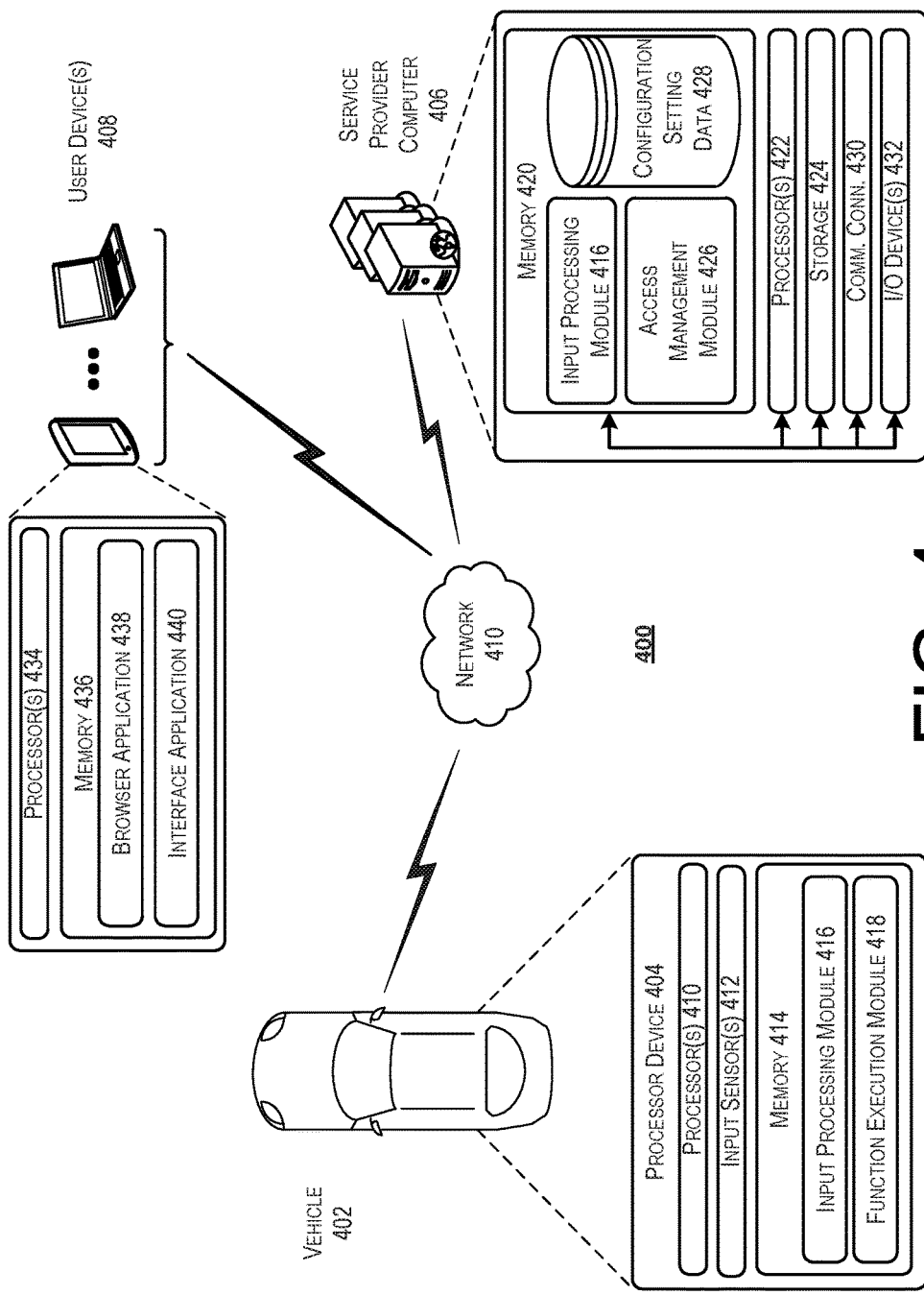
FIG. 4 depicts a system or architecture in which techniques for enabling user interaction with a vehicle control system may be implemented in accordance with the disclosure.

FIG. 4 depicts a system or architecture 400 in which techniques for enabling user interaction with a vehicle control system may be implemented in accordance with the disclosure. In some examples, a vehicle 402 may include a processor device 404. In some embodiments, the processor device 404 may be configured to communicate with a service provider computer 406 and/or a user device 408 via a network 410, or via other network connections.

The processor device 404 may be any type of computing device capable of performing the described functions. The processor device 404 may include one or more processors 410 capable of processing input from one or more input sensors 412. As is known in the art, there are a variety of input sensors 412 capable of detecting input related to a user or vehicle conditions, such as accelerometers, cameras, microphones, etc. The input obtained by the input sensors may be from a variety of data input types, including, but not limited to, audio data, visual data, or biometric data. Programmatic code for an application or module utilized in the implementation of at least some embodiments may be stored and executed from the memory 414 of processor device 404. The processor device 404 may include a module for processing input from one or more input sensors (input processing module 416) and/or a module for providing instructions to various components of the vehicle control system (function execution module 418).

Turning to the contents of the memory 414 in more detail, the memory 414 may include the one or more application programs or services for implementing the features disclosed herein, including an input processing module 416 and/or a function execution module 31.

In some embodiments, the input processing module 416 may be configured to receive input from one or more sensor devices located on the vehicle and map the received input to a vehicle condition. In some embodiments, the same type of sensor may be utilized to detect different inputs. For example, input received from an accelerometer may be mapped to a vehicle's acceleration or to a vehicle's directional tilt, depending on how the accelerometer is used. In some embodiments, input processing module 416 may be stored on, and executed from, the memory of the service provider computer 406. In these embodiments, the processor device 404 may transmit input data received from a sensor to the service provider computer for processing.

In some embodiments, the function execution module 418 may be configured to receive instructions provided by a user device and initiate one or more vehicle functions. For example, the vehicle control system may include actuation devices configured to perform one or more functions, such as locking or unlocking a vehicle door, turning on or off the engine, turning on or off a vehicle light (e.g., interior light, head lights, etc.), activating or deactivating a vehicle alarm, adjusting a temperature of the vehicle cabin, adjusting the temperature of a vehicle seat, opening the vehicle trunk, sounding the vehicle horn, or any other suitable vehicle function. The function execution module 418 may be configured to receive a request to perform one of these functions and may initiate execution of that function by providing instructions to the appropriate actuation device.

In some examples, the network(s) 410 may include any one or a combination of many different types of networks, such as cable networks, the Internet, wireless networks, cellular networks, and other private and/or public networks. It is also noted that the described techniques may apply in other client/server arrangements, as well as in non-client/server arrangements (e.g., locally stored applications, peer to-peer systems, etc.).

The service provider computer 406 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computer 406 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 406 may include at least one memory 420 and one or more processing units (or processor(s)) 422. The processor(s) 422 may be implemented as appropriate in hardware, computer-executable instructions, firmware or combinations thereof. Computer-executable instruction or firmware implementations of the processor(s) 422 may include computer-executable or machine executable instructions written in any suitable programming language to perform the various functions described.

The memory 420 may store program instructions that are loadable and executable on the processor(s) 410 and/or processor(s) 422, as well as data generated during the execution of these programs. Depending on the configuration and type of service provider computer 406, the memory 420 may be volatile (such as random access memory (RAM)) and/or non-volatile (such as read-only memory (ROM), flash memory, etc.). The service provider computer 406 may also include additional storage 424, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 420 may include multiple different types of memory, such as static random access memory (SRAM), dynamic random access memory (DRAM) or ROM. Turning to the contents of the memory 420 in more detail, the memory 420 may include an operating system 426 and one or more application programs or services for implementing the features disclosed herein including at least a module for processing input from one or more input sensors of a vehicle control system (input processing module 416) and/or a module for determining if a user has access a vehicle's functions (access management module 426). The memory 420 may also include configuration setting data 428, which provides data related to identifying portions of image information. In some embodiments, the configuration setting data 428 may be stored in a database.

The memory 420 and the additional storage 424, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the processor device 404 or the service provider computer 406. The service provider computer 406 may also contain communications connection(s) 430 that allow the service provider computer 406 to communicate with a stored database, another computing device or server, user terminals, and/or other devices on the network(s) 410. The service provider computer 406 may also include input/output (I/O) device(s) and/or ports 432, such as for enabling connection with a keyboard, a mouse, a pen, a voice input device, a touch input device, a display, speakers, a printer, etc.

Turning to the contents of the memory 420 in more detail, the memory 420 may include an operating system, a database containing configuration setting data 428 and the one or more application programs or services for implementing the features disclosed herein, including an input processing module 416 and/or an access management module 426.

In some embodiments, the access management module 426 may be configured to identify a user and/or determine if a user is authorized to interact with a vehicle. In some embodiments, a user may be registered with, or have an account maintained by, the service provider computer 406. The user account may also be associated with a particular vehicle. In some embodiments, the user may be required to verify ownership of (or at least a right in) the vehicle. In some embodiments, the service provider computer 406 may verify ownership of the vehicle with a government agency prior to associating the vehicle with the account of the user. In some embodiments, the vehicle may be equipped with a user interface. The vehicle may present a password or code that the user can use to verify ownership of the vehicle. The access management module 426 may be configured to transmit a command to the processor device 404 only upon determining that the user is authorized to interact with the vehicle. The user may be required to provide login information (e.g., a username and password combination) in order to access the user's account. In some embodiments, a user device may be associated with a user account, such that the service provider is able to identify the user from the user device identifier, and log the user into his or her account without login information being provided by the user. For example, the service provider computer may determine that a user device's phone number is associated with the user's account and may automatically log that user in.

Although described as being executed from the memory 420 of the service provider computer 406, the input processing module 416 and/or the access management module 426 may be located on, and executed from, the memory 414 of the processor device 404. In embodiments in which one or more of the modules are located on the service provider computer 406, the instructions for initiating one or more vehicle functions may be transmitted to the vehicle and executed by the vehicle control system.

The user devices 408 may be any type of computing device such as, but not limited to, a mobile phone, a smart phone, a personal digital assistant (PDA), a laptop computer, a desktop computer, a server computer, a thin-client device, a tablet PC, etc. Additionally, user devices 408 may be any type of wearable technology device, such as a watch, earpiece, glasses, etc. The user device 408 may include one or more processors 434 capable of processing user input. Embodiments of the application on the user device 408 may be stored and executed from its memory 436.

Turning to the contents of the memory 436 in more detail, the memory 436 may include a browser application 438. The memory 436 may also include an interface application 440 that is capable of enabling interaction between a user and the processor device 404 of the vehicle. Although sample architecture 400 depicts an interface application 440 as being included in the contents of the memory 436 of the user device 408, some embodiments may not include an interface application 440 in memory 436 of the user device 408. For example, the user device 408 may be a thin client device and the interface application 440 may be stored and executed from the service provider computer 406. In some embodiments, the browser application 438 may be the interface application 440. In those embodiments in which the interface application 440 is not included in memory 436, input received by user device 408 may instead be processed by the service provider computer 406.

In some embodiments, the interface application 440 may be configured to display a vehicle's condition to a user and/or receive a request from the user to perform a vehicle function. For example, the interface application 440 may be configured to display a number of function indicators, each mapped to a functionality of the vehicle that may be requested by the user. Upon receiving a selection of a functionality indicator from a user, the interface application may transmit the received selection to the service provider computer 406. The service provider computer 406 may then, if the user is authorized, convey the selection to the processor device 404 of the vehicle 402. In this example, the processor device 404 may subsequently initiate the selected function.

Figure 5:
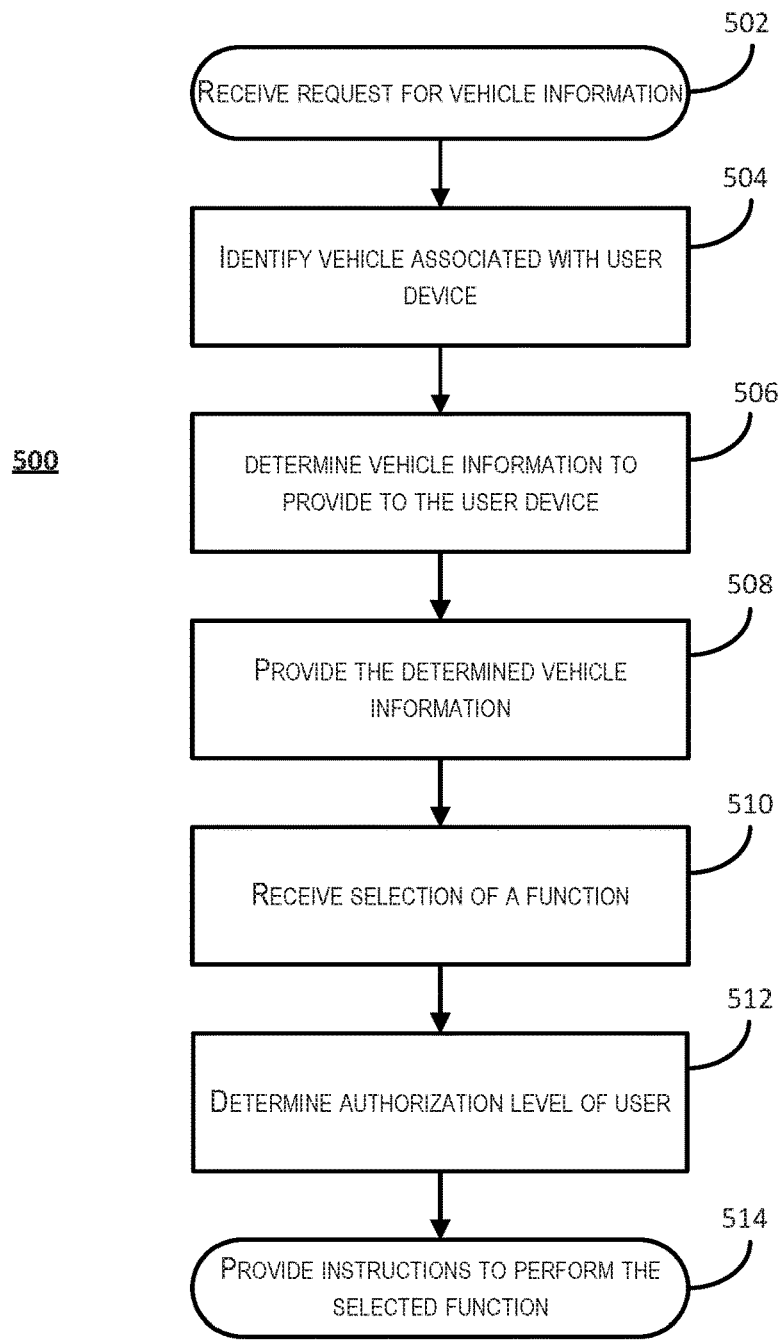
FIG. 5 depicts an illustrative flow chart demonstrating an example presentation, and subsequent execution, of a vehicle function via a user device in accordance with at least some embodiments.

FIG. 5 depicts an illustrative flow chart demonstrating an example presentation, and subsequent execution, of a vehicle function via a user device in accordance with at least some embodiments. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the one or more service provider computers 406 shown in FIG. 4. The code may be stored on a computer-readable storage medium, for example, in the form of a computer program including a plurality of instructions executable by one or more processors. The computer-readable storage medium may be non-transitory.

Process 500 may begin at 502, when a request for vehicle information is received from a user device. In some embodiments, the request may be provided via a vehicle control application installed on, and executed from, the user device. In some embodiments, the request may be received at a web server from a website maintained by a service provider computer. For example, the user device may access the website via a browser application executed on the user device. In this example, the user may be required to log into an account maintained by the web server. In some embodiments, the request may be received via messaging service, such as via short messaging service (SMS) or another messaging service.

At 504, the process 500 may identify one or more vehicles associated with the user device. For example, the user device may be associated with an account maintained at a service provider. The account may also be associated with one or more vehicles. The vehicles may then be identified by virtue of being associated with the user device via the account. In some embodiments, the user device may be presented with a list of vehicles associated with the device so that a user may select the one that he or she is interested in interacting with. In some embodiments, the user device may be associated with a vehicle via a relationship link stored in a database. In some embodiments, information related to the vehicle may be stored on the user device in relation to a vehicle control application. For example, the user device may store a VIN for the user's vehicle and may provide the VIN to the service provider when the user submits a request to interact with the vehicle.

At 506, the process 500 may determine what vehicle information should be sent to the user device. In some embodiments, an account associated with the user device may include one or more configuration settings with an indication of information preferences. For example, a user may elect to view certain details related to the vehicle as a default each time that the user submits a request. In another embodiment, the service provider may process information received from the vehicle to determine if there is information that needs to be addressed. For example, the service provider, upon analyzing vehicle information, may determine that the tire pressure for a particular tire is low. The service provider computer may determine that the user should be alerted to the low pressure. In some embodiments, the service provider may provide only vehicle information that is requested by the user device.

At 508, the process 500 may provide the determined vehicle information to the user device. In some embodiments, the service provider computer may modify the vehicle information prior to presenting it to the user device. For example, the user device may request a vehicle's location information. The request submitted to the service provider computer from the user device may include an indication of a location of the user device. The service provider computer may calculate, based on the location information for the vehicle and the location information from the user device, a distance and direction of the vehicle from the user device. The service provider computer may then provide the distance and direction information to the user device. In this example, the user device may display the vehicle location information as a directional indicator with an indication of the distance to the vehicle. The vehicle information provided to the user device may include a list of functions that may be performed by the vehicle control system upon initiation of the function by the user of the user device. The list of functions may be presented to a user of the user device.

At 510, the process 500 may receive a selection of a function from a list of functions provided in the vehicle information. The function may be any vehicle function, such as locking or unlocking a vehicle door, turning on or off the vehicle engine, turning on or off a vehicle light (e.g., interior light, head lights, etc.), activating or deactivating a vehicle alarm, adjusting a temperature of the vehicle cabin, adjusting the temperature of a vehicle seat, opening the vehicle trunk, sounding the vehicle horn, or any other suitable vehicle function.

At 512, the process 500 may determine whether the user is authorized to initiate the selected function. In some embodiments, a user may be authorized to initiate any function that is associated with a vehicle associated with his or her account. In some embodiments, an administrator or other user may create configuration settings to be associated with the vehicle and/or user account. For example, the owner of a vehicle may create a configuration setting that enables another user to lock and unlock doors on a vehicle, as well as start the engine of the vehicle, but does not allow the second user access to the vehicle's trunk. In another example, a user or administrator may lock a car stereo's volume at a particular level or lower. In these examples, the configuration settings may be provisioned onto the vehicle itself, such that the driver is unable to initiate a vehicle function that he or she is not authorized to initiate (even from the vehicle itself). In some embodiments, only those functions that the user is authorized to initiate may be provided to the user device in the vehicle information, such that the user is provided with a list of functions that he or she is able to initiate.

At 514, the process 500 may, upon determining that the user is authorized to initiate the selected function, provide instructions to a processor device of the vehicle control system to initiate the function. The processor device may identify one or more components of the system that are configured to execute the vehicle function, and may subsequently send instructions to those components to execute the vehicle function.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method of providing user interaction with a vehicle comprising:
   maintaining, at a server, a plurality of profiles, each of the profiles being associated with one or more users and one or more vehicles;
   receiving, by the server from a user device, a request for vehicle information, the user device associated with a user of the one or more users and having an application running thereon to display to the user, via a graphical user interface, vehicle identifiers associated with a plurality of vehicles associated with the user, the request received by the server in association with a selection, by the user via the application, of a vehicle of the plurality of vehicles, the request identifying the user and the vehicle;
   identifying, by the server in accordance with the request, one of the plurality of profiles as associated with the user, the identified profile indicating permissions and default information preferences for the user with respect to the plurality of vehicles;
   determining, by the server based on the permissions of the identified profile, that the user is authorized to receive the requested vehicle information for the vehicle;
   determining, by the server in response to the determining that the user is authorized to receive the requested vehicle information for the vehicle, a set of details related to the vehicle to provide to the user device in accordance with the default information preferences of the identified profile, the vehicle information including control information for at least one vehicle component of the vehicle, each of the at least one vehicle component being associated with a respective function that provides remote control of the vehicle component via the application in accordance with the control information; and directing, by the server, display by the graphical user interface of the application on the user device of a function indicator to indicate the respective function of each of the at least one vehicle component and a virtual control by which to remotely control each of the at least one vehicle component via the application in accordance with the control information.

2. The method of claim 1, wherein the vehicle information also includes information related to a condition of the vehicle.

3. The method of claim 2, wherein the condition of the vehicle is a speed at which the vehicle is traveling.

4. The method of claim 3, wherein the information related to the condition of the vehicle provided to the user device is a text notification sent to an owner of the vehicle indicating the speed at which the vehicle is traveling.

5. The method of claim 3, wherein the vehicle information is presented to a vehicle control application executed on the user device.

6. The method of claim 3, wherein the vehicle information is presented to a web browser application executed on the user device.

7. The method of claim 1, wherein the user device is a cellular phone.

8. The method of claim 1, wherein the directing comprises communicating instructions to the user device via a cellular network.

9. The wireless control system of claim 8, wherein the wireless control system is installed within a vehicle.

10. The wireless control system of claim 8, wherein the wireless control system further comprises a plurality of components controlling functionality of the vehicle, wherein the instructions to perform the selected function cause at least one of the plurality of components controlling functionality of the vehicle to perform the selected function.

11. The method of claim 1, further comprising:
receiving, from the application on the user device, a selection of a function from a plurality of functions, the selected function corresponding to preparing the vehicle for operation by a user of the user device;
identifying configuration settings associated with the selected function stored in relation to the profile; and
providing, to a processor device of the vehicle in response to receiving the selection, instructions to perform the selected function by causing a number of the vehicle components to be configured in accordance with the configuration settings.

12. The method of claim 11, wherein the selected function is at least one of locking a vehicle door, unlocking the vehicle door, turning on a vehicle engine, turning off the vehicle engine, turning on a vehicle light, turning off the vehicle light, activating a vehicle alarm, deactivating the vehicle alarm, adjusting a temperature of a cabin of the vehicle, adjusting a temperature of a seat within the vehicle, opening a trunk of the vehicle, and sounding a horn of the vehicle.

13. A wireless control system, comprising:
a processor device; and
a memory including instructions that, when executed with the processor device, cause the system to:
maintain, at a server, a plurality of profiles, each of the profiles being associated with one or more users and one or more vehicles;
receive, by the server from a user device, a request for vehicle information, the user device associated with a user of the one or more users and having an application running thereon to display to the user, via a graphical user interface, vehicle identifiers associated with a plurality of vehicles associated with the user, the request received by the server in association with a selection, by the user via the application, of a vehicle of the plurality of vehicles, the request identifying the user and the vehicle;
identify, by the server in accordance with the request, one of the plurality of profiles as associated with the user device, the identified profile indicating permissions and default information preferences for the user with respect to the plurality of vehicles;
determine, by the server based on the permissions of the identified profile, that the user is authorized to receive the requested vehicle information for the vehicle;
determine, by the server in response to the determining that the user is authorized to receive the requested vehicle information for the vehicle, a set of details related to the vehicle to provide to the user device in accordance with the default information preferences of the identified profile, the vehicle information including control information for at least one vehicle component of the vehicle, each of the at least one vehicle component being associated with a respective function that provides remote control of the vehicle component via the application in accordance with the control information; and
direct, by the server, display, by the graphical user interface of the application on the user device, of a function indicator to indicate the respective function of each of the at least one vehicle component and a virtual control by which to remotely control each of the at least one vehicle component via the application in accordance with the control information.

14. An apparatus comprising:
one or more input sensors mounted in a vehicle;
one or more actuation devices configured to execute a plurality of functions related to the vehicle;
an antenna; and
a processor device configured to:
receive, by a server via the antenna, a request for vehicle information in relation to a user device, the server maintaining a plurality of profiles, each of the profiles being associated with one or more users and one or more vehicles, the user device associated with a user of the one or more users and having an application running thereon to display to the user, via a graphical user interface, vehicle identifiers associated with a plurality of vehicles associated with the user, the request received by the server in association with a selection, by the user via the application, of a vehicle of the plurality of vehicles, the request identifying the user and the vehicle;
identify, by the server in accordance with the request, one of the plurality of profiles as associated with the user device, the identified profile indicating permissions and default information preferences for the user with respect to the plurality of vehicles;
determine, by the server based on the permissions of the identified profile, that the user is authorized to receive the requested vehicle information for the vehicle;

determine, by the server in response to the determining that the user is authorized to receive the requested vehicle information for the vehicle, a set of details related to the vehicle to provide to the user device in accordance with the default information preferences of the identified profile, the vehicle information including control information for at least one vehicle component of the vehicle, each of the at least one vehicle component being associated with a respective function that provides remote control of the vehicle component via the application in accordance with the control information; and direct display, by the graphical user interface of the application on the user device, of a function indicator to indicate the respective function of each of the at least one vehicle component and a virtual control by which to remotely control each of the at least one vehicle component via the application in accordance with the control information.

15. The apparatus of claim 14, wherein the user device is at least one of a mobile phone, a smart watch, a personal data assistant (PDA), a smart phone, or a wireless key.

16. The apparatus of claim 14, wherein the plurality of components controlling functionality of the vehicle are a plurality of electronic switches.

17. The apparatus of claim 14, wherein the processor device is further configured to determine if the user device is associated with a user that is authorized to receive the requested vehicle information, and wherein determining the requested vehicle information to provide to the user device in accordance with the identified profile is based on determining that the user is authorized to receive the requested vehicle information.

18. The apparatus of claim 17, wherein determining if the user is authorized to initiate the vehicle function comprises communicating with a server device to determine if an account for the user indicates that the user is authorized to initiate the function.

19. The apparatus of claim 17, wherein the plurality of functions of the vehicle that may be performed includes only those functions for which it is determined that the user associated with the user device is authorized to initiate.

* * * * *